US011985755B2

(12) United States Patent
Kobayashi et al.

(10) Patent No.: US 11,985,755 B2
(45) Date of Patent: May 14, 2024

(54) TARGET STRUCTURE AND TARGET DEVICE

(71) Applicant: RIKEN, Wako (JP)

(72) Inventors: Tomohiro Kobayashi, Wako (JP); Yoshie Otake, Wako (JP); Hideyuki Sunaga, Wako (JP); Xiaobo Li, Wako (JP)

(73) Assignee: RIKEN, Wako (JP)

( * ) Notice: Subject to any disclaimer, the term of this patent is extended or adjusted under 35 U.S.C. 154(b) by 230 days.

(21) Appl. No.: 17/262,886

(22) PCT Filed: Aug. 1, 2019

(86) PCT No.: PCT/JP2019/030234
§ 371 (c)(1),
(2) Date: Jan. 25, 2021

(87) PCT Pub. No.: WO2020/027266
PCT Pub. Date: Feb. 6, 2020

(65) Prior Publication Data

US 2021/0168925 A1 Jun. 3, 2021

(30) Foreign Application Priority Data

Aug. 2, 2018 (JP) ................................. 2018-145981

(51) Int. Cl.
*H05H 3/06* (2006.01)
*H05H 6/00* (2006.01)

(52) U.S. Cl.
CPC ................ *H05H 3/06* (2013.01); *H05H 6/00* (2013.01)

(58) Field of Classification Search
CPC .. H05H 6/00; H05H 3/06; G21G 4/02; G21K 5/08
See application file for complete search history.

(56) References Cited

U.S. PATENT DOCUMENTS 3,311,771 A 3/1967 Wood et al.
2013/0279638 A1 10/2013 Matsumoto et al.
2015/0117584 A1 4/2015 Yamagata et al.
(Continued)

FOREIGN PATENT DOCUMENTS

CN 207856090 U * 9/2018
DE 732 038 C 2/1943
(Continued)

OTHER PUBLICATIONS

Espacenet translation of Yajima (Year: 2011).*
(Continued)

*Primary Examiner* — Sharon M Davis
(74) *Attorney, Agent, or Firm* — Volpe Koenig

(57) ABSTRACT

A target structure includes a target and a cooling portion. The target generates neutrons by being irradiated with a charged particle beam. The cooling portion includes a front surface and a back surface that face to sides opposite to each other. The target is joined directly or indirectly to the front surface. A flow path for flowing of cooling liquid including hydrogen elements is formed in the cooling portion. When viewed in a thickness direction of the cooling portion from the front surface to the back surface, the flow path is positioned off a center portion of the target.

13 Claims, 8 Drawing Sheets

(56) References Cited

U.S. PATENT DOCUMENTS

| | | | |
|---|---|---|---|
| 2017/0267908 A1 | 9/2017 | Murakami et al. |
| 2018/0259462 A1 | 9/2018 | Otake et al. |
| 2019/0122780 A1 | 4/2019 | Murakami et al. |

FOREIGN PATENT DOCUMENTS

| | | | | |
|---|---|---|---|---|
| JP | 2011-185784 | A | | 9/2011 |
| JP | 2011185784 | A | * | 9/2011 |
| JP | 2012-119062 | A | | 6/2012 |
| JP | 2014-044098 | A | | 3/2014 |
| JP | 5888760 | B2 | | 3/2016 |
| JP | 2018-011872 | A | | 1/2018 |
| KR | 10-2009-0104462 | A | | 10/2009 |
| WO | 98/019740 | A1 | | 5/1998 |
| WO | 2016/088845 | A1 | | 6/2016 |
| WO | 2017/043581 | A1 | | 3/2017 |
| WO | 2017/183693 | A1 | | 10/2017 |

OTHER PUBLICATIONS

Extended European Search Report dated Sep. 15, 2021 for European Patent Application No. 19845165.0.

International Preliminary Report on Patentability dated Feb. 2, 2021 for PCT International Application No. PCT/JP2019/030234.

International Search Report, PCT/JP2019/030234, dated Oct. 29, 2019, 2 pgs.

Japanese Office Action dated Mar. 18, 2022 for Japanese Patent Application No. 2018-145981.

Japanese Office Action dated Jun. 24, 2022 for Japanese Patent Application No. 2018-145981.

Communication pursuant to Article 94(3) EPC dated Aug. 19, 2022 for European Patent Application No. 19845165.0.

* cited by examiner

TARGET STRUCTURE AND TARGET DEVICE

TECHNICAL FIELD

The present invention relates to a target structure including a target that generates neutrons by being irradiated with a charged particle beam. The present invention also relates to a target device including the target structure.

BACKGROUND ART

A target device is provided in a neutron source that generates neutrons. The neutron source generates and accelerates charged particles, and irradiates a target in the target device with the accelerated charged particle beam. Thereby, the neutron source generates neutrons from the target.

In recent years, a neutron source has been enabled to be reduced in size, and there has been developed a technique of non-destructively inspecting an inspection object by making a neutron beam incident on the inspection object, using a small-sized neutron source. For example, a neutron beam is made incident on an inspection object, and the inspection object can be inspected based on the returned neutrons after being scattered in the inspection object (refer to Patent Literature 1 mentioned below, for example). One example of inspection of an inspection object is inspection of whether or not a specific substance component or a cavity exists in the inspection object (the same applies to the following). Alternatively, a neutron beam is made incident on an inspection object, a transmission image is generated based on the neutron beam after being transmitted through the inspection object, and an inspection object can be inspected based on the transmission image. Patent Literature 2 mentioned below describes the contents related to a part of the embodiment of the present invention.

CITATION LIST

Patent Literatures

PTL 1: International Publication No. WO2017/043581
PTL 2: Japanese Patent No. 5888760

SUMMARY OF INVENTION

Technical Problem

Since a target is heated by being irradiated with a charged particle beam, the target is cooled such that a temperature of the target does not become too high. For example, the target is cooled such that the solid target is prevented from melting by being heated. For the cooling, a flow path for flowing of cooling liquid (e.g., water) is formed in a structure portion to which the target is joined.

However, neutrons generated in the target are decelerated by hydrogen elements in the cooling liquid when passing through the cooling liquid in the flow path. In many cases, when an inspection object is inspected by use of a neutron beam, it is desirable that a high-speed un-decelerated neutron beam is made incident on the inspection object. For example, when a neutron beam is made incident on an inspection object, and the inspection object is inspected based on the neutrons returned by scattering, the number of neutrons returned by scattering from deep positions in the inspection object is reduced since the neutron beam is decelerated by hydrogen elements in cooling liquid. For this reason, a deep part of the inspection object cannot be inspected. In another case of an inspection object having a large thickness, when a neutron beam is made incident on the inspection object, and a transmission image is generated based on the neutron beam that has been transmitted through the inspection object, the large thickness of the inspection object reduces the number of the neutrons transmitted through the inspection object. For this reason, the inspection object having a large thickness cannot be inspected.

In view of it, an object of the present invention is to prevent hydrogen elements in cooling liquid from decelerating a neutron beam emitted to an outside when the cooling liquid cools a target that generates the neutrons by being irradiated with a charged particle beam.

Solution to Problem

A target structure according to the present invention includes a target and a cooling portion. The target generates neutrons by being irradiated with a charged particle beam. The cooling portion includes a front surface and a back surface that face to sides opposite to each other. The target is joined directly or indirectly to the front surface. A flow path for flowing of cooling liquid including hydrogen elements is formed in the cooling portion. When viewed in a thickness direction of the cooling portion from the front surface to the back surface, the flow path is positioned off a center portion of the target.

A target device according to the present invention includes the above-described target structure and a shielding structure that covers the target structure and shields the target structure from an outside. The shielding structure includes a support portion to which the cooling portion is attached. In the shielding structure, a particle path and a neutron path are formed. The particle path allows a charged particle beam from an outside to pass to the target in the thickness direction of the cooling portion. The neutron path allows neutrons generated in the target to pass to an outside in the thickness direction of the cooling portion.

ADVANTAGEOUS EFFECTS OF INVENTION

According to the present invention, the flow path is positioned off the center portion of the target when viewed in the thickness direction of the cooling portion. Accordingly, when neutrons are generated from the target irradiated with a charged particle beam, and the neutron beam is thereby emitted in the thickness direction of the cooling portion, the neutron beam is emitted without passing through cooling liquid of the flow path in the thickness direction. Thus, the emitted neutron beam is not decelerated by hydrogen elements included in the cooling liquid of the flow path. In this manner, it is possible to prevent the hydrogen elements in the cooling liquid from decelerating the neutrons.

DESCRIPTION OF EMBODIMENTS

The following describes an embodiment of the present invention, with reference to the drawings. The same reference sign is allocated to the corresponding part in each of the drawings, and duplicate description is omitted.

Entire Configuration of Target Device

Figure 1:
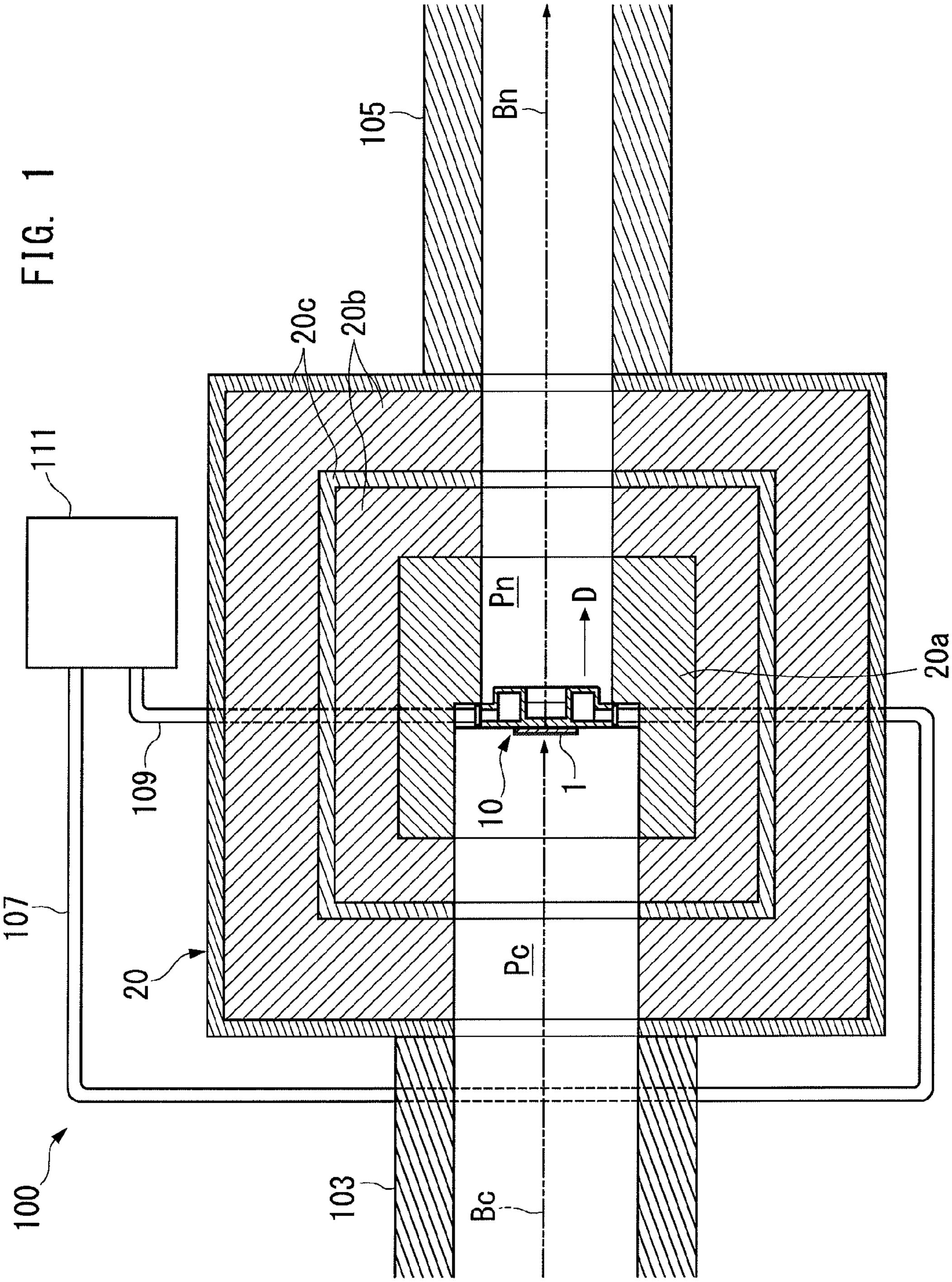
FIG. 1 is a sectional view illustrating one example of a target device according to an embodiment of the present invention.

FIG. 1 is a sectional view illustrating one example of a target device 100 to which a target structure 10 according to an embodiment of the present invention can be applied. The target device 100 generates neutrons from a target 1 of the target structure 10 when the target 1 is irradiated with a charged particle beam Bc introduced from an outside. The target structure 10 thereby emits the neutron beam Bn to an outside in an emission direction D for a predetermined purpose.

In the present embodiment, the predetermined purpose is non-destructive inspection of an inspection object as described above. In other words, in the non-destructive inspection, for example, a neutron beam Bn emitted from the target device 100 in the emission direction D is made incident on an inspection object, and the inspection object is inspected based on the neutrons scattered and returned by the inspection object. Alternatively, a neutron beam Bn is made incident on an inspection object, a transmission image is generated based on the neutron beam Bn that has been transmitted through the inspection object, and the inspection object is inspected based on the transmission image. The predetermined purpose may be different from the non-destructive inspection of an inspection object, and may be a different purpose of using neutrons generated by the target 1, without decelerating the neutrons (by hydrogen elements of the below-described cooling liquid L).

The target device 100 includes the target structure 10 and a shielding structure 20 that covers the target structure 10 and shields the target structure 10 from an outside. The shielding structure 20 includes a support portion 20*a* to which the target structure 10 (e.g., the below-described cooling portion 3) is attached. The shielding structure 20 is formed of a material through which neutrons and gamma rays are hardly transmitted. A particle path Pc and a neutron path Pn are formed in the shielding structure 20. The particle path Pc allows a charged particle beam Bc from an outside to pass to the target 1 in the emission direction D. The neutron path Pn allows neutrons generated in the target 1 to pass as a neutron beam Bn to an outside in the emission direction D. In other words, the particle path Pc and the neutron path Pn penetrate through the shielding structure 20. In the example of FIG. 1, the particle path Pc and the neutron path Pn are positioned on the same straight line extending in the emission direction D.

In FIG. 1, a particle duct 103 is connected to the shielding structure 20. The particle duct 103 allows a charged particle beam Bc to pass so as to be introduced into the particle path Pc. In FIG. 1, a neutron duct 105 is connected to the shielding structure 20. The neutron duct 105 guides, to an outside, a neutron beam Bn that has been generated in the target 1 and that has passed through the neutron path Pn.

A charged particle beam Bc is generated by a particle beam generation device (represented in FIG. 2A), and is introduced into the target device 100. For example, in the particle beam generation device, protons (hydrogen ions) are generated by an ion source, the generated protons are accelerated by an accelerator, and a direction and a spreading degree of the accelerated proton beam are adjusted by magnetic field coils. The proton beam whose direction and spreading degree have been adjusted is introduced as a charged particle beam Bc into the particle path Pc through the particle duct 103.

Each proton of a proton beam entering the target 1 has energy of 7 MeV, for example. Each neutron of a neutron beam Bn emitted to an outside of the target device 100 has energy equal to or higher than 1 MeV (e.g., equal to or higher than 4 MeV and equal to or lower than 5 MeV), for example. However, the present invention is not limited to this.

In one example, the shielding structure 20 may include a plurality of shielding portions 20*a* to 20*c* overlapping with each other. The shielding portion 20*a* is a neutron reflecting body, and is formed of a material (e.g., graphite) that reflects neutrons. The shielding portions 20*b* are each a neutron shielding body, and are formed of a material (e.g., BPE: borated polyethylene) that shields from neutrons. The shielding portions 20*c* are each a gamma ray shielding body, and is formed of a material (e.g., Pb) that shields from gamma rays.

Configuration of Target Structure

Figure 2A:
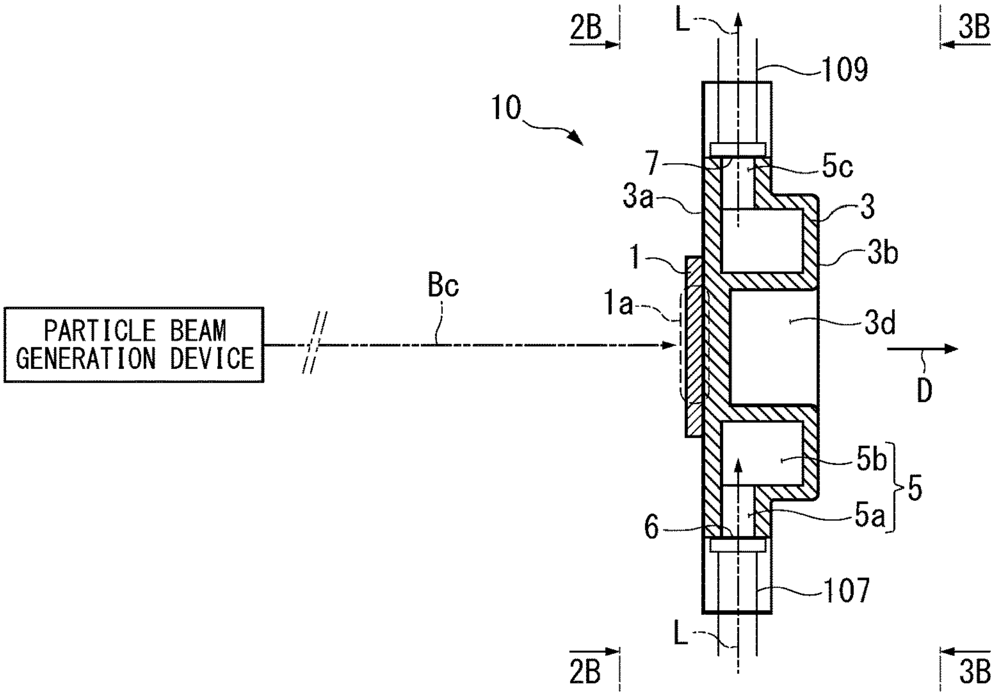
FIG. 2A is a partial enlarged view in FIG. 1, and is a sectional view illustrating a target structure according to the embodiment of the present invention.
Figure 2B:
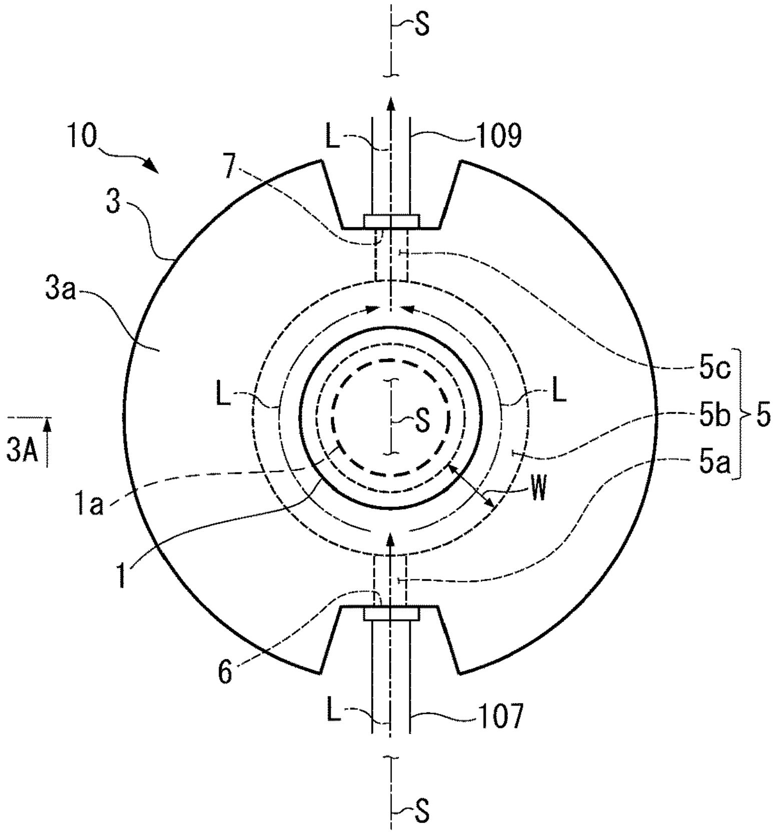
FIG. 2B is a 2B-2B arrow view in FIG. 2A.
Figure 3A:
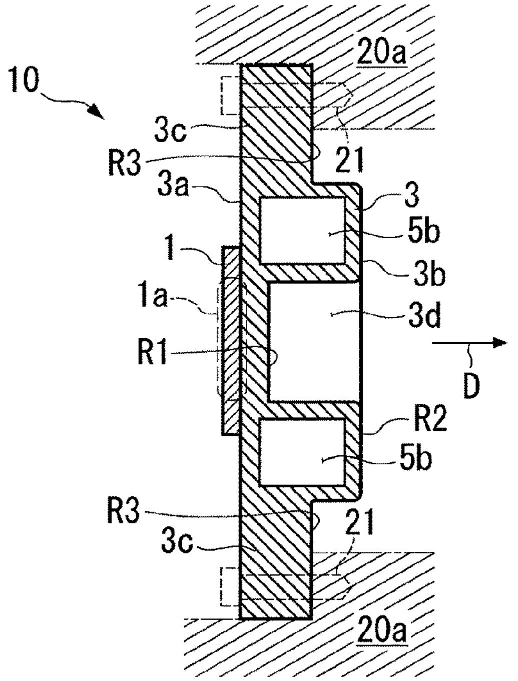
FIG. 3A is a 3A-3A sectional view in FIG. 2B.
Figure 3B:
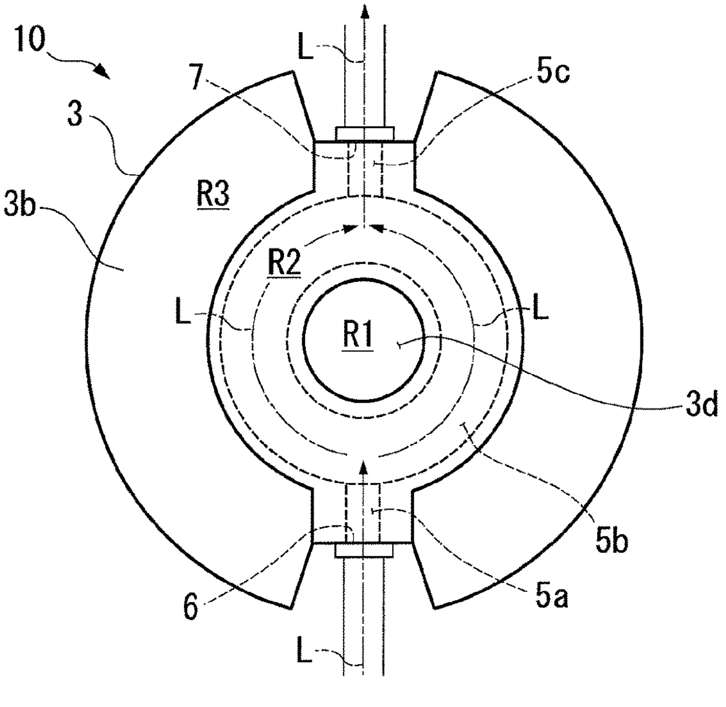
FIG. 3B is a 3B-3B arrow view in FIG. 2A.

FIG. 2A is a partial enlarged view in FIG. 1, and is a sectional view illustrating only the target structure 10, an inflow tube 107, and an outflow tube 109. FIG. 2B is a 2B-2B arrow view in FIG. 2A, FIG. 3A is a 3A-3A sectional view in FIG. 2B, and FIG. 3B is a 3B-3B arrow view in FIG. 2A.

Figure 4A:
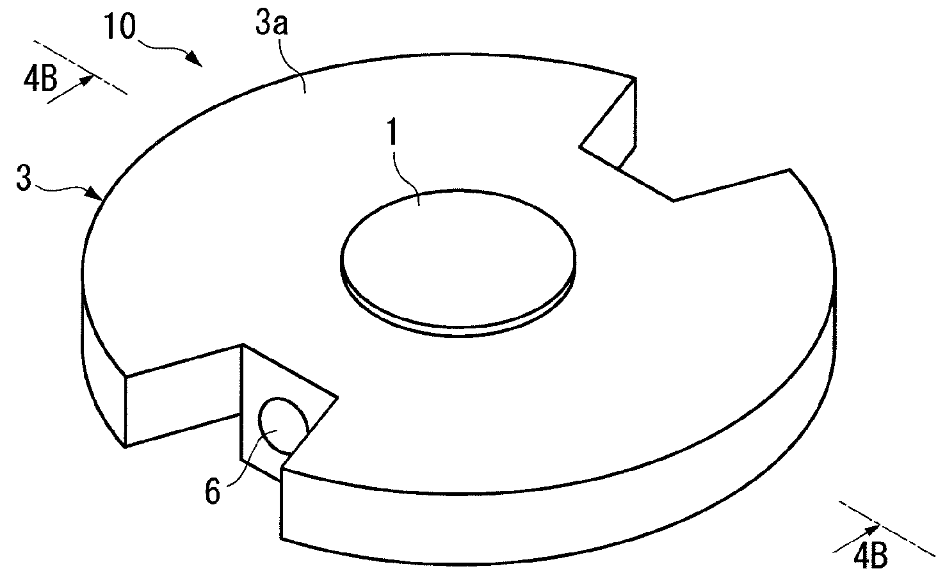
FIG. 4A is a perspective view of the target structure viewed from a left side of FIG. 2A.
Figure 4B:
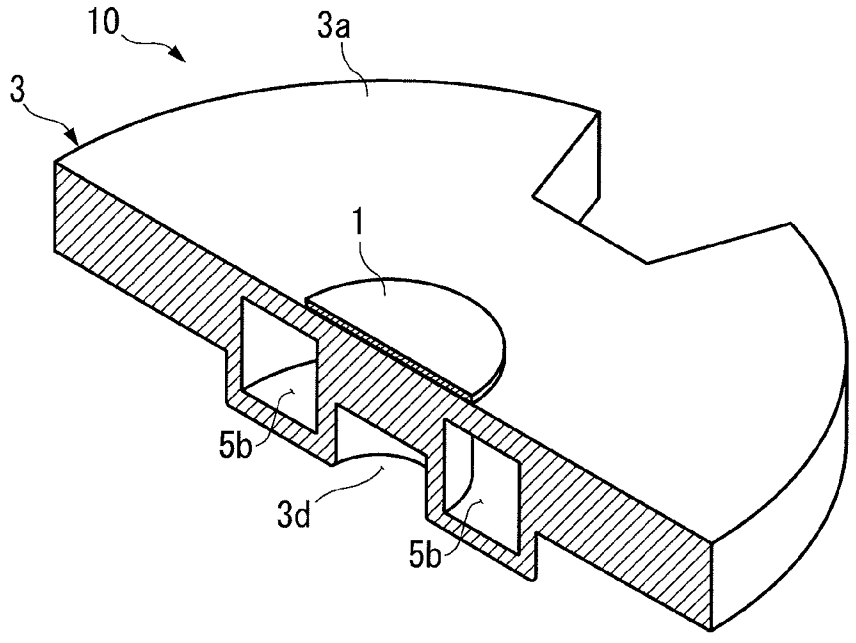
FIG. 4B is a perspective view depicting a 4B-4B section in FIG. 4A.
Figure 5A:
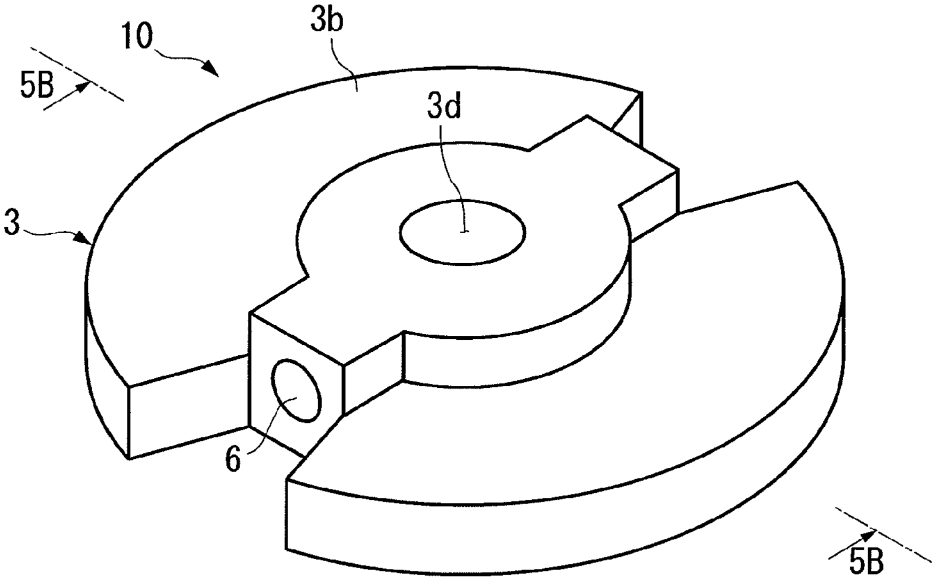
FIG. 5A is a perspective view of the target structure viewed from a right side of FIG. 2A.
Figure 5B:
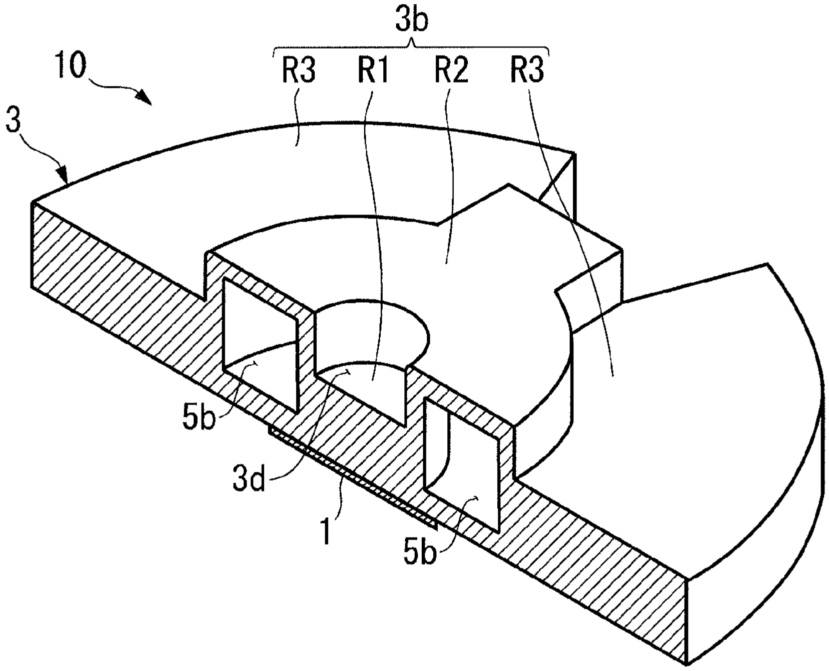
FIG. 5B is a perspective view depicting a 5B-5B section in FIG. 5A.

FIG. 4A is a perspective view of the target structure 10 viewed from a left side of FIG. 2A. FIG. 4B is a perspective view depicting a 4B-4B section in FIG. 4A. FIG. 5A is a perspective view of the target structure 10 viewed from a right side of FIG. 2A. FIG. 5B is a perspective view depicting a 5B-5B section in FIG. 5A.

The target structure 10 generates neutrons by being irradiated with a charged particle beam Bc, and emits a neutron beam Bn in the emission direction D for the above-described predetermined purpose. The target structure 10 includes the target 1 and the cooling portion 3.

The target 1 generates neutrons by being irradiated with a charged particle beam Bc. The target 1 is in a solid state at a room temperature in the present embodiment. The target 1 may be formed of lithium (Li), beryllium (Be), a lithium compound, or a beryllium compound, for example, but may be formed of a different material. The lithium compound may be lithium fluoride (LiF), lithium carbonate ($Li_2CO_3$), or lithium oxide ($Li_2O$), for example. The beryllium compound may be beryllium oxide (BeO), for example.

The target 1 generates heat by being irradiated with a charged particle beam Bc. The target 1 may have a plate shape as illustrated in FIG. 4A. In this case, the target 1 may have a circular shape, a rectangular shape, or a different shape when viewed in a thickness direction of the target 1. In an example of FIG. 4A, the target 1 has a disk shape. The target 1 does not need to have a plate shape, and may have a different shape.

The cooling portion 3 receives heat from the target 1 and thereby cools the target 1. The cooling portion 3 may be formed in a substantially flat plate shape as illustrated in FIG. 5A. As illustrated in FIG. 2A, the cooling portion 3 includes a front surface 3*a* and a back surface 3*b* that face to sides opposite to each other. As illustrated in FIG. 2A and FIG. 4A, the front surface 3*a* may be flat. The target 1 is joined directly or indirectly (directly in FIG. 2A) to the front surface 3*a* of the cooling portion 3. In this case, a back surface of the plate-shaped target 1 (the right surface in FIG. 2A) may be directly or indirectly joined to the front surface 3*a* of the cooling portion 3. The target 1 may be joined to the front surface 3*a* of the cooling portion 3 by pressure joining. This pressure joining may be made by diffusion joining (e.g., HIP: hot isostatic pressing). The target 1 may be joined to the front surface 3*a* of the cooling portion 3 by different means (e.g., brazing or bolts).

A flow path 5 is formed in the cooling portion 3. Cooling liquid L flows through the flow path 5. In the present embodiment, the cooling liquid L is liquid including hydrogen elements. In an example, the cooling liquid L is water. The cooling liquid L may be water to which an additive (e.g., an anticorrosive agent, an antibacterial agent, a pH buffering agent, or the like) has been added. The cooling liquid L may be an organic solvent including hydrogen elements and having a boiling temperature equal to or higher than a predetermined value. This predetermined value is a value (e.g., 80° C., 100° C., or 120° C.) at which the organic solvent is kept in a liquid state when neutrons are generated from the target 1 in the target device 100 as described above.

The cooling portion 3 is formed of a heat conductive material. The heat conductive material may be a metallic material. This metallic material may satisfy one or both of the following criteria 1 and 2.

Criterion 1: Each radionuclide generated in the metallic material by neutrons from the target has a half-life equal to or shorter than predetermined time period (e.g., 12 hours).

Criterion 2: A radioactivity intensity (per unit volume or per unit weight) of the metallic material in which radionuclides are generated by neutrons from the target is equal to or smaller than a predetermined value.

Specific examples of the metallic material that forms the cooling portion 3 may include copper (Cu), titanium (Ti), vanadium (V), nickel (Ni), iron (Fe), aluminum (Al), and an alloy of any combination of these. Here, the copper may be pure copper. When the cooling portion 3 is formed of copper, high thermal conductivity can be achieved, and the above-described criteria 1 and 2 are satisfied. The cooling portion 3 may be formed of only the above-described metallic material, or may include the above-described metallic material as a main component. The cooling portion 3 is formed by casting in an example, but may be formed by a different method (e.g., a method of forming from metal powder by a 3D printer).

A thickness direction of the cooling portion 3 from the front surface 3*a* to the back surface 3*b* of the cooling portion 3 is the above-described emission direction D. In the example of FIG. 2A, the emission direction D is a direction orthogonal to the front surface 3*a* of the cooling portion 3 that is a flat surface. When viewed in the emission direction D, as illustrated in FIG. 2B, the flow path 5 (the entire flow path 5 in the present embodiment) is positioned off a center portion 1*a* (i.e., an area surrounded by a broken line in FIG. 2A and FIG. 2B) of the target 1. In FIG. 2B, the reference sign W indicates a width of a main flow path portion 5*b*.

More specifically, as illustrated in FIG. 2B, when viewed in the emission direction D, the flow path 5 (the below-described main flow path portion 5*b*) may be formed so as to surround the center portion 1*a* of the target 1. When viewed in the emission direction D, as illustrated in FIG. 2B, the flow path 5 (the below-described main flow path portion 5*b*) may extend in a circumferential direction (hereinafter, also referred to simply as the circumferential direction) around the center portion 1*a* of the target 1. When viewed in the emission direction D, the flow path 5 (the entire flow path 5 or the below-described main flow path portion 5*b*) may be formed in line symmetry with respect to a reference straight line S passing through the center portion 1*a* (a center of the center portion 1*a*). Such a flow path 5 may extend along the front surface 3*a* of the cooling portion 3. When viewed in the emission direction, an area that is included in the target 1 and that is irradiated with a charged particle beam Bc may be an entire area of the center portion 1*a* or a partial area within the center portion 1*a*, for example.

The flow path 5 includes an inflow portion 5*a*, the main flow path portion 5*b*, and an outflow portion 5*c*. Cooling liquid L flows into the inflow portion 5*a* from an outside of the cooling portion 3. The cooling liquid L flows from the inflow portion 5*a* into the main flow path portion 5*b*. The main flow path portion 5*b* may extend along the front surface 3*a*. In the example of FIG. 2B, when viewed in the emission direction D, a shape of the main flow path portion 5*b* is an annular shape that continuously extends in the circumferential direction so as to form a complete one loop. By the outflow portion 5*c*, the cooling liquid L that has flowed through the main flow path portion 5*b* is allowed to flow to an outside of the cooling portion 3.

In the example of FIG. 2B, the cooling liquid L that has flowed into the main flow path portion 5*b* from the inflow portion 5*a* is divided so as to flow through a right-side portion and a left-side portion in the main flow path portion 5*b*, merges again, and flows into the outflow portion 5*c*.

When viewed in a direction opposite to the emission direction D (i.e., the thickness direction of the cooling portion 3), as illustrated in FIG. 3B and FIG. 5B, the back surface 3*b* of the cooling portion 3 includes an inner area R1 and a flow-path-overlapping area R2, the inner area R overlaps with the center portion 1*a* of the target 1, and the flow-path-overlapping area R2 includes a part surrounding the inner area R1 and overlapping with the flow path 5. When viewed in the direction opposite to the emission direction D, the inner area R1 may be an area whose shape and size are equivalent to those of the entire center portion 1*a* of the target 1. In the back surface 3*b* of the cooling portion 3, the inner area R1 is depressed from the flow-path-overlapping area R2. In other words, the inner area R1 forms a depression 3*d* in the back surface 3*b* of the cooling portion 3. The depression 3*d* shortens a distance by which neutrons from the target 1 pass through the cooling portion 3 in the emission direction D.

A shape of the depression 3*d* is not limited to the example of FIG. 2A, FIG. 5A, and FIG. 5B. For example, an area of a cross section of the depression 3*d* may increase as a position shifts from a bottom surface of the depression 3*d* to a side opposite to the front surface 3*a* of the cooling portion 3. This cross section is one along a plane orthogonal to the emission direction D.

In the example, when viewed in the direction (hereinafter, also referred to simply as the opposite direction) opposite to the emission direction D, as illustrated in FIG. 3B and FIG. 5B, the back surface 3*b* of the cooling portion 3 further includes an outer circumferential area R3 surrounding the flow-path-overlapping area R2. The flow-path-overlapping area R2 protrudes from both the inner area R1 and the outer circumferential area R3 to a side (in the emission direction D) opposite to the front surface 3*a* of the cooling portion 3. Thereby, a cross-sectional area of the flow path 5 is increased.

Attachment of Target Structure

The cooling portion 3 includes an outer circumferential portion 3*c* (FIG. 3A) surrounding the center portion 1*a* of the target 1 when viewed in the emission direction D. A back surface (a surface on a right side in FIG. 3A) of the outer circumferential portion 3*c* is the above-described outer circumferential area R3. As illustrated in FIG. 3A, the outer circumferential portion 3*c* is attached to the support portion 20*a* of the target device 100 (in the emission direction D, for example). This attachment may be made by bolts 21 or different appropriate means. When the bolts 21 are used, holes through which the bolts 21 penetrate in the emission direction D may be formed in the outer circumferential portion 3*c*.

Structure to Supply Cooling Liquid

As illustrated in FIG. 2A, the inflow portion 5*a* and the outflow portion 5*c* in the cooling portion 3 include respective openings 6 and 7 to an outside of the cooling portion 3. In a state where the target structure 10 is attached to the support portion 20*a* of the target device 100 as illustrated in FIG. 1 for example, the inflow tube 107 is connected to the opening 6 of the inflow portion 5*a*, and the outflow tube 109 is connected to the opening 7 of the outflow portion 5*c*. The inflow tube 107 and the outflow tube 109 extend from the respective openings 6 and 7 to an outside of the shielding structure 20 while penetrating through the shielding structure 20. The cooling liquid L is allowed to flow into the flow path 5 from an outside of the shielding structure 20 through the inflow tube 107. The cooling liquid L that has flowed through the flow path 5 is allowed to flow to an outside of the shielding structure 20 through the outflow tube 109. The inflow tube 107 and the outflow tube 109 may be connected to a cooling liquid supply device 111 outside the shielding structure 20.

In this case, by the cooling liquid supply device 111, the cooling liquid L is caused to flow into the inflow portion 5*a* through the inflow tube 107, and the cooling liquid L that has flowed out from the outflow portion 5*c* is caused to flow to an outside of the target device 100 through the outflow tube 109. The cooling liquid supply device 111 may be a device called a chiller, for example. The chiller may include a mechanism (such as a pump) for causing the cooling liquid L to flow into and circulate through the inflow tube 107, the flow path 5, and the outflow tube 109 in this order, and a mechanism (such as a chilling unit) for cooling the cooling liquid L that has returned from the outflow tube 109.

Advantageous Effects of Embodiment

According to the above-described target structure 10 of the present embodiment, when viewed in the thickness direction of the cooling portion 3 (in the emission direction D), the flow path 5 is positioned off the center portion 1*a* of the target 1. Accordingly, neutrons generated in the target 1 by being irradiated with a charged particle beam Bc are emitted to an outside in the emission direction D without passing through cooling liquid L in the flow path 5. For this reason, a neutron beam Bn is emitted to an outside in the emission direction D without being decelerated by hydrogen elements included in the cooling liquid L in the flow path 5. Therefore, the high-speed neutron beam Bn can be emitted from the target device 100 more effectively than in the conventional case, and can be made incident on an inspection object for non-destructive inspection.

Since a charged particle beam Bc enters the center portion 1*a* of the target 1, the center portion 1*a* generates heat. When viewed in the emission direction D, the flow path 5 is formed so as to surround the center portion 1*a*. Thus, the cooling liquid L flowing through the flow path 5 can cool the target 1 efficiently and rapidly.

When viewed in the emission direction D, the flow path 5 extends in the circumferential direction around the center portion 1*a* of the target 1. Thus, the flow path 5 around the center portion 1*a* can be formed in a relatively simple shape. The flow path 5 extends along the front surface 3*a* to which the target 1 is joined. Thus, the target 1 can be effectively cooled.

The back surface (e.g., the entire back surface) of the plate-shaped target 1 is joined to the front surface 3*a* of the cooling portion 3. Thus, heat of the target 1 can be rapidly transferred to the cooling portion 3.

In the back surface 3*b* of the cooling portion 3, the inner area R1 is depressed from the flow-path-overlapping area R2. Neutrons generated in the target 1 pass through the depressed inner area R1 in the emission direction D. Thus, a distance by which neutrons from the target 1 pass through the cooling portion 3 in the emission direction D is shortened. Accordingly, it is possible to reduce a possibility that a neutron is scattered or diffracted by the cooling portion 3 when passing through the cooling portion 3.

The flow-path-overlapping area R2 protrudes from the outer circumferential area R3 (and the inner area R1) in the emission direction D. Thus, in the cooling portion 3, a cross-sectional area of the flow path 5 can be increased while a thickness of a part other than a part forming the flow-path-overlapping area R2 is reduced.

The present invention is not limited to the above-described embodiment. As a matter of course, various modifications can be made within the scope of the technical idea of the present invention. For example, the target structure 10 according to the embodiment of the present invention does not need to include all of a plurality of the above-described matters, and may include only a part of a plurality of the above-described matters.

Further, any one of the following modification examples 1 to 6 may be individually adopted, or two or more of the modification examples 1 to 6 may be arbitrarily combined and adopted. In this case, the points that are not described below are the same as those described above.

Modification Example 1

Figure 6:
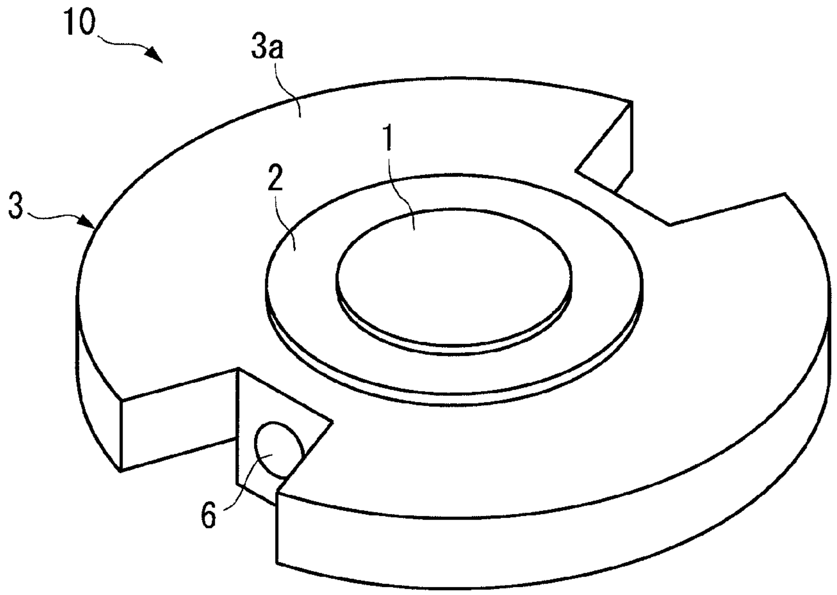
FIG. 6 corresponds to FIG. 4A, and illustrates a configuration example in which a target is joined indirectly to a front surface of a cooling portion.

In FIG. 2A and others described above, the target 1 is joined directly to the front surface 3*a* of the cooling portion 3. However, the target 1 may be joined indirectly to the front surface 3*a* of the cooling portion 3. FIG. 6 corresponds to FIG. 4A, and illustrates a configuration example in which the target 1 is joined indirectly to the front surface 3*a* of the cooling portion 3.

As illustrated in FIG. 6, the target 1 may be joined to the front surface 3*a* of the cooling portion 3 via a metal layer 2. In this case, the back surface (the surface facing downward in FIG. 6) of the plate-shaped target 1 may be joined to a front surface (the surface facing upward in FIG. 6) of the metal layer 2, and a back surface of the metal layer 2 may be joined to the front surface 3*a* of the cooling portion 3. The metal layer 2 may be a plate-shaped member. The joining of the metal layer 2 to the cooling portion 3 and the joining of the target 1 to the metal layer 2 may be made by pressure joining (e.g., diffusion joining) or brazing.

The metal layer 2 is provided for preventing blistering of the target 1. The blistering is a phenomenon in which when the target 1 is irradiated with a proton beam as a charged particle beam Bc, the target 1 is destroyed due to accumulation of protons (hydrogen) in the target 1.

The metal layer 2 may be a metal layer described in Patent Literature 2, for example. In other words, the metal layer 2 may satisfy the following condition.

Condition: the metal layer 2 includes a metallic element as a main component. The metallic element has, at 60° C., a hydrogen diffusion coefficient equal to or larger than $10^{-11}$ ($m^2$/second). Among radionuclides generated by the metallic elements receiving a neutron beam Bn, a type of radionuclides having the largest total radiation dose has a half-life equal to or shorter than a predetermined time period (e.g., 12 hours).

Specific examples of the metallic element may include vanadium (V), nickel (Ni), titanium (Ti), and an alloy of any combination of these.

The metal layer 2 is provided so that in the target 1 and the metal layer 2, hydrogen generated by the above-described proton beam is quickly diffused to reduce a concentration of hydrogen or release hydrogen to an outside. Thus, the blistering of the target 1 can be prevented.

When the cooling portion 3 is formed of a material satisfying the above-described condition, the cooling portion 3 can prevent the blistering of the target 1. Accordingly, in this case, the metal layer 2 does not need to be provided.

Meanwhile, when the cooling portion 3 is not formed of a material satisfying the above-described condition (e.g., when the cooling portion 3 is formed of copper or a material including copper as a main component), the metal layer 2 may be provided as described above for preventing the blistering.

The metal layer 2 may have, in addition to or instead of the function of preventing the blistering of the target 1, a function of increasing a strength of pressure joining of the target 1 to the cooling portion 3. In other words, in the case where the back surface of the metal layer 2 is joined to the front surface 3*a* of the cooling portion 3 by pressure joining (e.g., diffusion joining), and the back surface of the target 1 is joined to the front surface of the metal layer 2 by pressure joining, a strength of pressure joining of the target 1 to the cooling portion 3 is higher than the case where the target 1 is joined directly to the front surface 3*a* of the cooling portion 3 by pressure joining.

Modification Example 2

Figure 7:
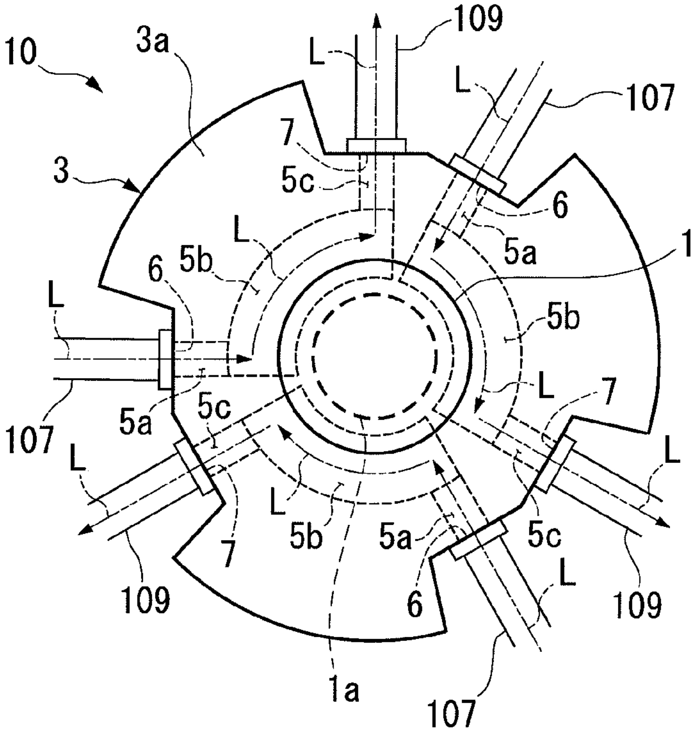
FIG. 7 corresponds to FIG. 2B, and illustrates the case where a flow path includes three sets of inflow portions, main flow path portions, and outflow portions.

In the above description, the flow path 5 includes one set of the inflow portion 5*a*, the main flow path portion 5*b*, and the outflow portion 5*c*. However, the flow path 5 may include a plurality of sets of the inflow portions 5*a*, the main flow path portions 5*b*, and the outflow portions 5*c*. FIG. 7 corresponds to FIG. 2B, and illustrates the case where the flow path 5 includes three sets of the inflow portions 5*a*, the main flow path portions 5*b*, and the outflow portions 5*c*. The respective sets may be independent of each other. For each of the sets, the above-described inflow tube 107 and outflow tube 109 are provided. The number of such sets is three in FIG. 7, but may be two, or be four or more.

For each of the sets, one cooling liquid supply device 111 described above may be provided. In other words, a plurality of the cooling liquid supply devices 111 may be provided.

Alternatively, one shared cooling liquid supply device 111 may be provided for a plurality of the sets. In other words, the one cooling liquid supply device 111 may supply cooling liquid L to a plurality of the inflow tubes 107 corresponding to a plurality of the respective sets. In this case, one first tube extending from the cooling liquid supply device 111 may branch halfway into a plurality of the inflow tubes 107, and a plurality of the outflow tubes 109 extending from the cooling portion 3 may merge into one second tube leading to the cooling liquid supply device 111. The cooling liquid supply device 111 may cool cooling liquid L flowing from the second tube, and then supply the cooling liquid L to a plurality of the inflow tubes 107 via the first tube.

Providing a plurality of sets of the inflow portions 5*a*, the main flow path portions 5*b*, and the outflow portions 5*c* can shorten the respective flow paths 5. Thus, a total flow rate of cooling liquid L caused to flow through the cooling portion 3 can be increased.

Modification Example 3

Figure 8:
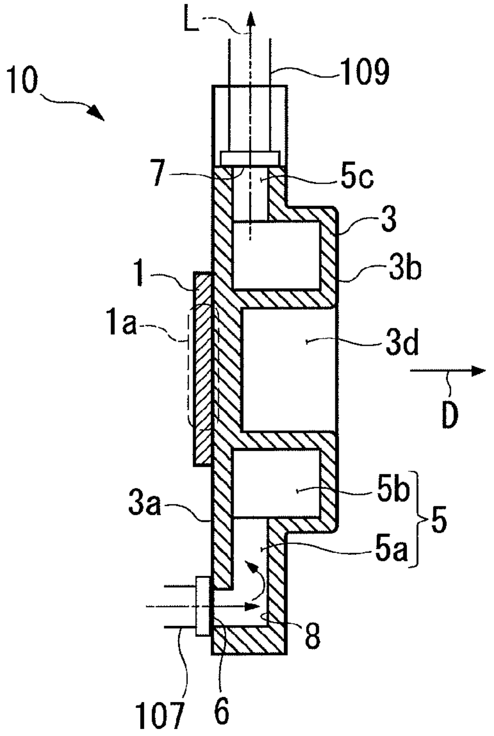
FIG. 8 is a diagram corresponding to FIG. 2A, and illustrates another configuration example of the flow path.

FIG. 8 is a diagram corresponding to FIG. 2A, and illustrates a configuration in the case of the modification example 3. As illustrated in FIG. 8, an inner surface of the inflow portion 5*a* includes an area 8. Cooling liquid L that has flowed from an outside of the cooling portion 3 (from the inflow tube 107) through the opening 6 collides with the area 8 in a direction intersecting with (e.g., orthogonal to) the front surface 3*a* of the cooling portion 3. In an example of FIG. 8, the opening 6 is formed on the front surface 3*a* of the cooling portion 3, and the area 8 faces toward a side of the front surface 3*a*. However, the opening 6 may be formed on the back surface 3*b* of the cooling portion 3, and the collision area 8 may face toward a side of the back surface 3*b*.

Cooling liquid L that has flowed into the inflow portion 5*a* through the opening 6 collides with the area 8 of the inner surface of the inflow portion 5*a*, thereby causing turbulence of the cooling liquid L. In a state where the turbulence exists, the cooling liquid L passes through the main flow path portion 5*b*. Accordingly, in the course of passing through the main flow path portion 5*b*, the entire liquid L contacts with an inner surface belonging to the main flow path portion 5*b* and positioned on a side of the target 1, or mixes with each other. Thus, the entire liquid L can contribute to cooling of the target 1.

Modification Example 4

A plural layers of flow paths 5 adjacent to each other in the thickness direction D of the cooling portion 3 may be formed. In this case, a plural layers of flow paths 5 may share the one inflow portion 5*a* and the one outflow portion 5*c*, and thereby communicate with each other. Alternatively, a plural layers of flow paths 5 may be independent of each other.

Modification Example 5

In the above description, the flow path 5 is formed inside the cooling portion 3. However, a part (e.g., the main flow path portion 5*b*) or the entirety of the flow path 5 may be formed as a groove on the back surface 3*b* of the cooling portion 3. In this case, a cover member that closes the groove may be attached to the back surface 3*b* of the cooling portion 3. Thereby, the flow path 5 may be defined by the cover member and an inner surface of the groove.

Alternatively, a part (e.g., the main flow path portion 5*b*) or the entirety of the flow path 5 may be formed as a groove on the front surface 3*a* of the cooling portion 3. In this case, a cover member that closes the groove may be attached to the front surface 3*a* of the cooling portion 3. Thereby, the flow path 5 may be defined by the cover member and an inner surface of the groove. When viewed in the emission direction D, the cover member may have a shape (e.g., an annular shape) surrounding the target 1. Alternatively, the cover member may be the target 1. In this case, the target 1 as the cover member may have a size and a shape such that the target 1 overlaps with both the inner area R1 and the flow-path-overlapping area R2 (refer to FIG. 3A, for example) when viewed in the emission direction D.

Modification Example 6

An appropriate mechanism for switching, at time intervals, a direction in which cooling liquid L flows through the flow path 5 may be provided. In this case, this mechanism may be provided, outside the target device 100, at intermediate positions of the inflow tube 107 and the outflow tube 109.

Reference Example

Differently from the above, when cooling liquid L does not include hydrogen elements, the flow path 5 and the center portion 1*a* of the target 1 may overlap each other in the emission direction D. Such cooling liquid L may be liquid gallium, for example. Since the cooling liquid L does not include hydrogen elements, a neutron beam Bn is emitted to an outside in the emission direction D without being decelerated by the cooling liquid L even when the neutron beam Bn passes through the cooling liquid L.

REFERENCE SIGNS LIST

1: target, 2: metal layer, 1*a*: center portion, 3: cooling portion, 3*a*: front surface, 3*b*: back surface, 3*c*: outer circumferential portion, 3*d*: depression, 5: flow path, 5*a*: inflow portion, 5*b*: main flow path portion, 5*c*: outflow portion, 6 and 7: opening, 8: area in inner surface of inflow portion, 10: target structure, 20: shielding structure, 20*a*: shielding portion (support portion), 20*b*: shielding portion, 20*c*: shielding portion, 21: bolt, 100: target device, 103: particle duct, 105: neutron duct, 107: inflow tube, 109: outflow tube, 111: cooling liquid supply device, Pc: particle path, Pn: neutron path, R1: inner area, R2: flow-path-overlapping area, R3: outer circumferential area, D: emission direction (thickness direction of cooling portion), Bc: charged particle beam, Bn: neutron beam, L: cooling liquid

The invention claimed is:

1. An apparatus comprising:

a particle beam generation device that generates a charged particle beam;

a target structure that generates neutrons when irradiated with the charged Particle beam, the target structure comprising:

a target plate comprising a central area on which the charged particle beam impinges and a peripheral area on which the charged particle beam does not impinge; and a cooling member formed of a metallic material, the cooling member including a front surface facing the charged particle beam to which the target plate is directly or indirectly joined, a back surface opposite the front surface, and a flow path for flowing cooling liquid including hydrogen atoms formed between the front surface and the back surface, wherein the charged particle beam travels in a thickness direction of the cooling member from the front surface to the back surface; and a shielding structure surrounding the target structure, the shielding structure having a particle path formed therein, the particle path allowing the charged particle beam to pass through the shielding structure and irradiate only the central area of the target plate, wherein, when viewed in the thickness direction, entirety of the flow path is offset from the central area of the target plate, and covers an area outside of the central area of the target plate such that no portion of the flow path overlaps with the central area of the target plate.

2. The apparatus according to claim 1, wherein the flow path surrounds the central area of the target plate when viewed in the thickness direction.

3. The apparatus according to claim 1, wherein when viewed in the thickness direction, the flow path is formed in line symmetry with respect to a reference straight line passing through the central area of the target plate.

4. The apparatus according to claim 1, wherein the flow path extends along the front surface.

5. The apparatus according to claim 1, wherein a back surface of the target plate is joined directly or indirectly to the front surface of the cooling member.

6. The apparatus according to claim 1, wherein the cooling member is formed of copper, titanium, vanadium, nickel, iron, aluminum, or an alloy of any combination thereof.

7. The apparatus according to claim 1, wherein the target plate is formed of lithium, beryllium, a lithium compound, or a beryllium compound.

8. The apparatus according to claim 1, wherein the flow path includes:

an inflow portion into which cooling liquid flows from an outside of the cooling member;

a main flow path portion into which cooling liquid flows from the inflow portion and that extends along the front surface; and an outflow portion that allows cooling liquid having flowed through the main flow path portion to flow to an outside of the cooling member, wherein an inner surface of the inflow portion includes an area with which cooling liquid having flowed from an outside of the cooling member collides in a direction intersecting with the front surface of the cooling member.

9. The apparatus according to claim 1, wherein the flow path includes:

an inflow portion into which cooling liquid flows from an outside of the cooling member;

a main flow path portion into which cooling liquid flows from the inflow portion and that extends along the front surface; and an outflow portion that allows cooling liquid having flowed through the main flow path portion to flow to an outside of the cooling member, wherein the inflow portion, the main flow path portion, and the outflow portion constitute one set, and the flow path includes one set or a plurality of sets of the inflow portions, the main flow path portions, and the outflow portions.

10. The apparatus according to claim 1, wherein when viewed in a direction opposite to the thickness direction, the back surface of the cooling member includes an inner area and a flow-path-overlapping area, the inner area overlaps with the central area of the target plate, and the flow-path-overlapping area surrounds the inner area and overlaps with the flow path, and the inner area is depressed from the flow-path-overlapping area.

11. The apparatus according to claim 1 wherein the shielding structure includes a support portion to which the target structure is attached, and a neutron path is formed in the shielding structure, and the neutron path allows neutrons generated in the target plate to pass to an outside of the shielding structure in the thickness direction.

12. The apparatus according to claim 1, wherein the flow path is defined proximate the central area of the target plate, when viewed in the thickness direction, to enable cooling the target plate by the cooling liquid.

13. The apparatus according to claim 1, wherein the flow path partially overlaps with the peripheral area of the target plate when viewed in the thickness direction.

* * * * *